(12) United States Patent
Patel et al.

(10) Patent No.: US 6,657,979 B1
(45) Date of Patent: Dec. 2, 2003

(54) REDUCED POWER CONSUMPTION MULTIPLEXER USING SELF-DECODING POWER DOWN LOGIC

(75) Inventors: Lalit Odhavji Patel, Mesa, AZ (US); William Oliver Mathes, Tempe, AZ (US); Kevin Jurek, Gilbert, AZ (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/379,248

(22) Filed: Aug. 23, 1999

(51) Int. Cl.[7] .............................................. H04B 7/185
(52) U.S. Cl. ..................... 370/318; 370/535; 370/537
(58) Field of Search ................. 370/318, 537, 370/535, 241; 455/13.4, 67; 713/300; 375/207; 301/31, 603; 326/105

(56) References Cited

U.S. PATENT DOCUMENTS

| | | | |
|---|---|---|---|
| 5,210,450 A | * 5/1993 | Parkinson | 307/603 |
| 5,298,810 A | 3/1994 | Scott et al. | 307/475 |
| 5,337,285 A | 8/1994 | Ware et al. | 365/227 |
| 5,999,562 A | * 12/1999 | Hennedy et al. | 375/207 |
| 6,054,877 A | * 4/2000 | Ventrone | 326/105 |
| 6,105,139 A | * 8/2000 | Dey et al. | 713/300 |
| 6,307,281 B1 | * 10/2001 | Houston | 307/31 |

* cited by examiner

*Primary Examiner*—Dang Ton
*Assistant Examiner*—Robert W. Wilson
(74) *Attorney, Agent, or Firm*—Frank J. Bogacz

(57) ABSTRACT

A multiplexer output cell (FIG. 1, 15) controls the operation of multiplexer input cells (100, 105) in a multistage multiplexer according to the value of a signal select input (130), and a state control input (180). A signal driver (125) having a number of logical outputs comparable to the number of stages in the multiplexer is used in conjunction with the state control signal (170, 175, 180) to control the power ON/OFF state of each cell in the multiplexer. The multiplexer input and output cells (100, 105, 150) which are in the signal path are set to a power ON condition, while the multiplexer input and output cells (100, 105, 150) which are not in the signal path are set to a power OFF position. In this manner, only those cells which are in the signal path are powered ON, resulting in significant power savings.

14 Claims, 6 Drawing Sheets

REDUCED POWER CONSUMPTION MULTIPLEXER USING SELF-DECODING POWER DOWN LOGIC

TECHNICAL FIELD

The invention relates generally to the field of communication electronics and, more particularly, to low power consumption multiplexers.

BACKGROUND OF THE INVENTION

In a communications system, a multiplexer is used to select a single output from a variety of inputs. As the number of inputs to the multiplexer increases, the complexity and power consumption of the multiplexer increases accordingly. In modern communications systems, it is commonplace to make use of multiplexers which incorporate many inputs (for example, 128) with a single output (128:1). As communication systems continue to increase in capacity and bandwidth, it is likely that these systems will require multiplexers with larger and larger numbers of inputs.

When a typical multiplexer is in use, each of the signal input paths is active at any given time whether or not a particular signal input path is selected for output. Thus, in an exemplary 128:1 multiplexer, each of the 128 input paths remains active at all times. In an exemplary high speed 128:1 multiplexer, where source coupled field effect transistor logic is employed in order to increase switching speeds, maintaining each of the 128 input paths in the active state implies that each of the transistors used in the 128:1 multiplexer is biased in the active or saturation modes at all times. In this type of a multiplexer, keeping all of the unused signal paths active represents a significant waste of power since only one signal path is used at any given time. When the multiplexer is employed in a communications node such as an orbiting satellite, where available power must be derived from solar energy and batteries, the use of equipment which consumes significant power causes an increase in payload weight, required cooling, overall deployment cost, and complexity of the communications system. These costs must, in turn, be eventually passed on the subscriber of the satellite communications service.

Therefore, what is highly desirable, is a high speed multiplexer which does not require inactive signal paths to be in an active state. What is also highly desirable, is a high speed multiplexer which does not require complex decoding logic in order to select the signal path through the multiplexer stages.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures.

DESCRIPTION OF THE PREFERRED EMBODIMENTS

A reduced power consumption multistage multiplexer using self-decoding power down logic provides an efficient means for signal input selection in high speed multistage multiplexers which use technologies such as source coupled field effect transistor logic, or emitter coupled bipolar transistor logic. The non-blocking digital switch implementation provides built-in channel selection and self-decoding techniques to provide a means for inactivating all logic cells except those in the selected channel path. In a 4:1 multistage multiplexer, this implementation reduces power consumption by 33 percent. As the multiplexer incorporates additional input channels, the power savings increases as a larger and larger percentage of the logic cells are powered OFF. For example, when used in a 128:1 multiplexer the implementation reduces power consumption by 94.5 percent. These factors make the multiplexer attractive for use in both terrestrial-based and satellite-based communications nodes.

Figure 1:
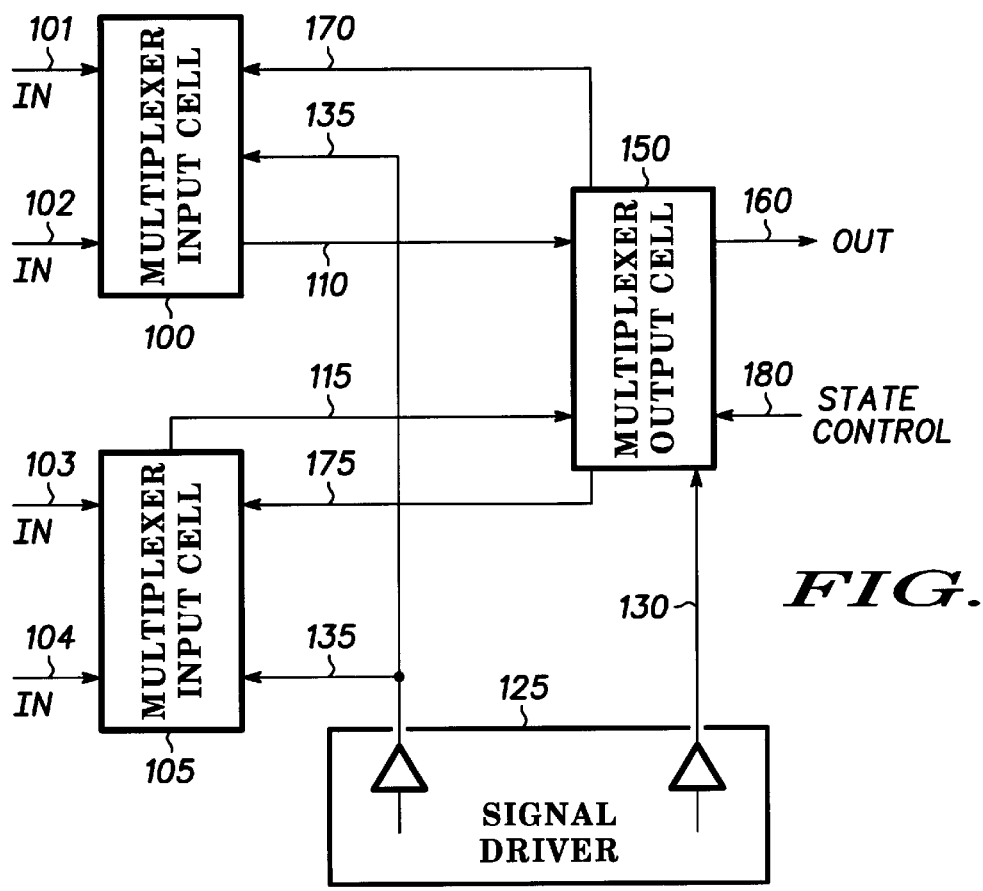
FIG. 1 is a block diagram of a reduced power consumption multistage multiplexer which accepts four signal inputs and presents a single signal output in accordance with a preferred embodiment of the invention.

FIG. 1 is a block diagram of a reduced power consumption multistage multiplexer which accepts four signal inputs and presents a single signal output in accordance with a preferred embodiment of the invention. In FIG. 1, signal inputs 101 and 102, which represent signals from an electronic device, are present at an input of multiplexer input cell 100. In a similar manner, signal inputs 103 and 104 are present at an input of multiplexer input cell 105. Preferably, multiplexer input cells 100 and 105 possess substantially identical design and performance characteristics.

Selection of an input by multiplexer input cell 100 is determined by the state of signal select input 135. Similarly, selection of an input by multiplexer input cell 105 is also determined by the state of signal select input 135. In a preferred embodiment, multiplexer input cells 100 and 105 select a signal input and present the signal at intermediate signal output 110 and 115, respectively. Therefore, as an example, which is not intended to be limiting in any way, a logic HIGH value for signal select input 135 may cause multiplexer input cell 100 to select signal input 101 to be present at intermediate signal output 110. Similarly, a logic HIGH may also cause multiplexer input cell 105 to select signal input 103 to be present at intermediate signal output 115. Further, a logic LOW value for signal select input 135 may cause multiplexer input cell 100 to select signal input 102 to be present at intermediate signal output 110, and cause multiplexer input cell 105 to select signal input 104 to be present at intermediate signal output 115. Thus, through the use of a HIGH or LOW value for signal select input 135, multiplexer input cells 100 and 105 can select a desired input for output at intermediate signal outputs 110 and 115.

In an alternate embodiment, each of multiplexer input cells 100 and 105 may include more than two signal inputs. For example, in the event that four signal inputs were present at multiplexer input cell 100, signal select input 135 could be representative of two discrete logic HIGH/LOW inputs, thereby enabling multiplexer input cell 100 to select between one of four inputs. Those of ordinary skill in the art are acquainted with techniques which could allow multiplexer input cell 100 to select between any number of inputs including implementing signal select input 135 as multiple parallel inputs, thereby allowing multiplexer input cells 100 and 105 to select between any number of inputs to be present at intermediate signal outputs 110 and 115, respectively.

Intermediate signal outputs 110 and 115 are coupled to multiplexer output cell 150. In a manner similar to that used for multiplexer input cells 100 and 105, multiplexer output cell 150 includes signal select input 130 which allows the selection of either intermediate signal output 110 or 115 to be present at signal output 160. Multiplexer output cell 150 is distinguished from multiplexer input cells 100 and 105 in that multiplexer output cell 150 includes an output for upper path control signal 170 and lower path state control signal 175. In a preferred embodiment, these signals are used by multiplexer input cells 100 and 105 to control primary power to the multiplexer input cells. Thus, a logic HIGH for upper path state control signal 170 may cause multiplexer input cell 100 to remain in a power ON operating state. Additionally, a logic LOW for upper path state control signal 170 may cause multiplexer input cell 100 to enter a power OFF state. In a preferred embodiment, lower path state control signal 175 operates similarly to upper path state control signal 170 with similar effects on multiplexer input cell 105. Additionally, state control input 180 controls the operating state of multiplexer output cell 150. In a preferred embodiment, a logic HIGH at state control input 180 causes multiplexer output cell 150 to remain in a power ON condition, while a logic LOW causes multiplexer output cell 150 to enter a power OFF condition.

Through the use of state control signals such as upper and lower path state control signals 170 and 175, the unused signal paths through the multiplexer of FIG. 1 can be set to a power OFF state. Thus, in this example, one of multiplexer input cells 100 and 105 can be set to the OFF state resulting in a 33 percent reduction in power consumption.

FIG. 1 also includes signal driver 125 for use in the multistage multiplexer of FIG. 1. In a preferred embodiment, signal driver 125 possesses a number of signal select logical outputs equal to the number of stages in the multiplexer. Thus, in FIG. 1, signal select inputs 130 and 135 represent two logical outputs of signal driver 125 with both multiplexer input cells 100 and 105 being fanned out from a single logical output of signal driver 125. In an alternate embodiment, where "N" number of stages are present, signal driver, 125 includes "N" logical outputs, thereby interfacing with $2^N-1$ multiplexer cells, such as multiplexer input and output cells 100, 105, and 150.

Each of the signal select output values is fed to multiplexer input and output cells 100, 105, and 150, in order to control the operating state of each cell in the multistage multiplexer of FIG. 1. These output values are determined in accordance with a signal path map which maps an input of the multistage multiplexer of FIG. 1 to signal output 160.

Figure 2:
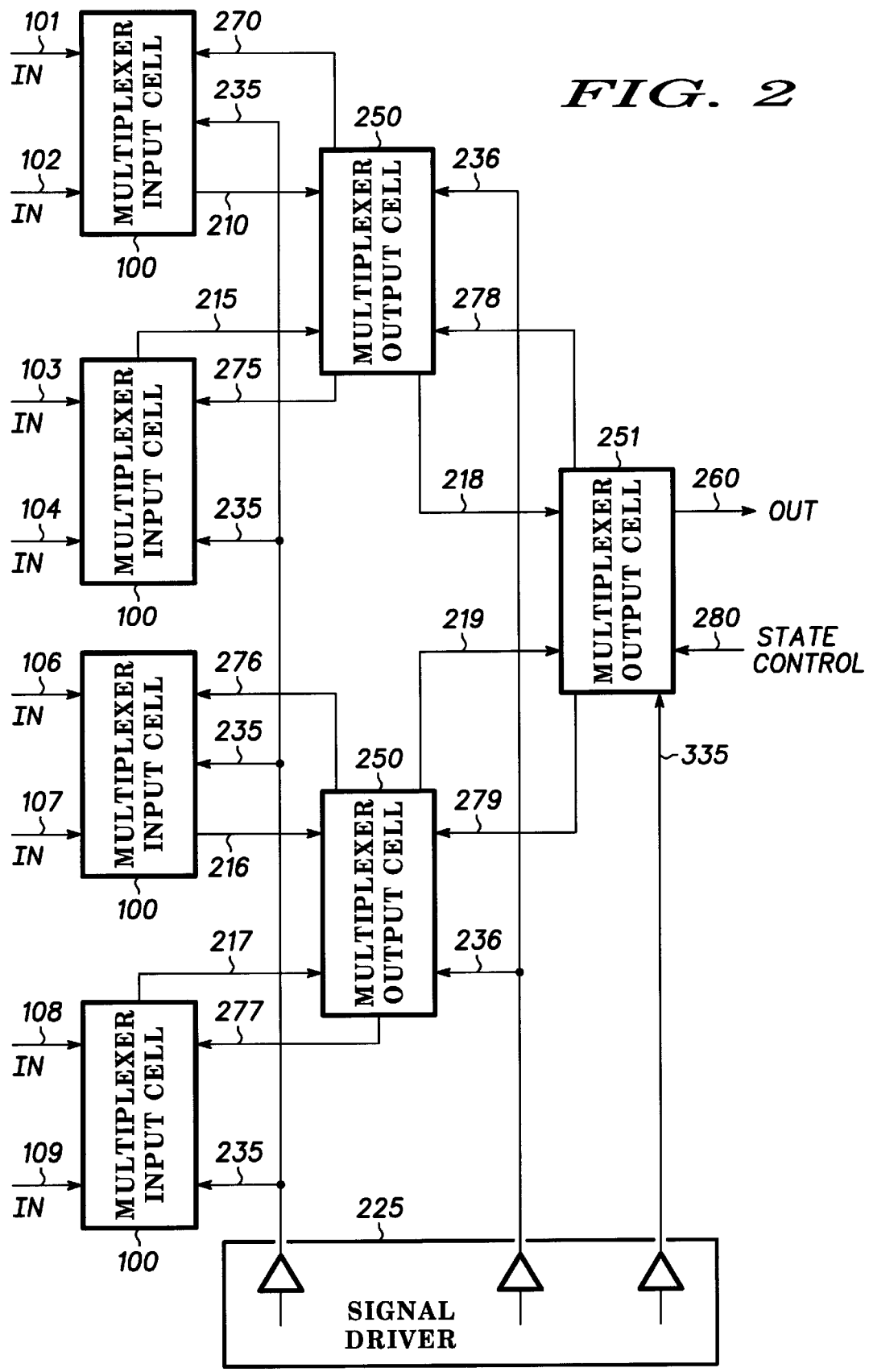
FIG. 2 is a block diagram of a reduced power consumption multistage multiplexer which accepts eight signal inputs and presents a single signal output in accordance with a preferred embodiment of the invention.

FIG. 2 is a block diagram of a reduced power consumption multistage multiplexer which accepts eight signal inputs and presents a single signal output in accordance with a preferred embodiment of the invention. In FIG. 2, signal inputs 101 through 104 and 106 through 109 are present at an input of one of multiplexer input cells 100. In a manner similar to that used to select an input by multiplexer input cell 100 of FIG. 1, signal select input 235 enables each of multiplexer input cells 100 to select between an input and present the input at intermediate signal outputs 210, 215, 216, and 217. Additionally, signal select input 236 can be used by each of multiplexer output cells 250 in order to select the appropriate one of intermediate signal outputs 210 or 215, and 216 or 217 to be present at intermediate signal output 218 and 219. Preferably, signal select input 236 and upper and lower path control signals 278 and 279 are also used by each of multiplexer output cells 250 to generate the appropriate logic HIGH/LOW outputs for upper path state control signals 270 and 276, as well as lower path state control signals 275 and 277.

Similarly, signal select input 335 is desirably used by multiplexer output cell 251 to select one of intermediate signal outputs 218 or 219 to be present at signal output 260 and to generate the appropriate logic HIGH/LOW outputs for upper path state control signal 278 and lower path state control signal 279. State control signal 280 is set to HIGH in order to maintain multiplexer output cell 251 in the power ON state. Thus, when one of signal inputs 101 through 104 and 106 through 109 of FIG. 2 is selected to be present at signal output 260, only three of the seven multiplexer cells of FIG. 2 need remain active. This results in a 57 percent reduction in power consumption by the multiplexer of FIG. 2.

FIG. 2 also includes signal driver 225 for use in the multistage multiplexer. In accordance with a preferred embodiment, signal driver 225 possesses three logical outputs which provide signal select inputs 235, 236, and 237. The three logical outputs interface to the seven multiplexer input cells 100, 250, and 251, as shown in FIG. 2 (for N=3, $2^3-1=7$, from the discussion of FIG. 1). Three multiplexer input cells 100 are coupled to a single logical output of signal driver 225. In a similar manner, both of multiplexer output cells 250 are coupled to signal driver 225 through signal select input 236 representing a single logical output of signal driver 225. Further, multiplexer output cell 251 is coupled to signal driver 225 through signal select input 335

Each of the signal select output values is fed to multiplexer input and output cells 100, 250, and 251, in order to aid in the control the operating state of each cell in the multistage multiplexer. Preferably, these output values are binary state outputs which control the power ON/OFF state of multiplexer input and output cells 100, 250, and 251 in conjunction with upper and lower path state control signals 270, 275, 276, 277, 278, 279, and 280.

Figure 3:
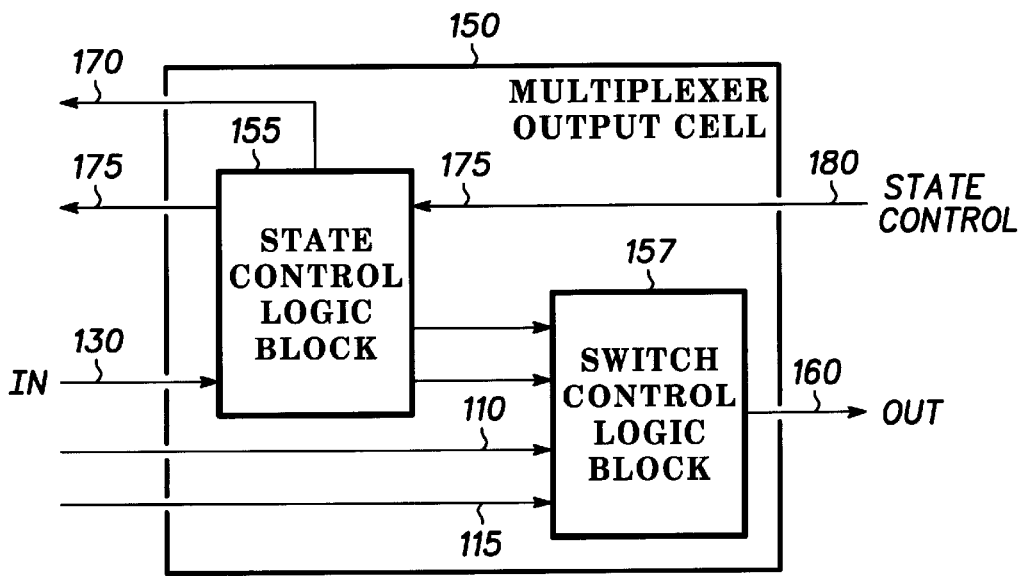
FIG. 3 is a block diagram of a multiplexer output cell used in a reduced power consumption multistage multiplexer in accordance with a preferred embodiment of the invention.

FIG. 3 is a block diagram of a multiplexer output cell (150) used in a reduced power consumption multistage multiplexer in accordance with a preferred embodiment of the invention. In FIG. 3, multiplexer output cell 150 includes state control logic block 155 which accepts a signal select input 130 as an input. Based on the logic state of signal select input 130, state control logic block 155 sets the appropriate HIGH/LOW state for upper and lower path state control signal outputs 170 and 175. Additionally, state control logic block 155 conveys the logic state of signal select input 130 to switch control logic block 157. In a preferred embodiment, this causes switch control logic block 157 to select between intermediate signal 110 and intermediate signal 115. Thus, either intermediate signal 110 or 115 are present at signal output 160.

In a preferred embodiment, state control input 180 is also used to set the HIGH/LOW state of upper and lower path state control signals 170 and 175 in conjunction with the value of a signal select input. It is envisioned that when state control input 180 is set to the HIGH state, one of upper and lower path state control signals 170 and 175 is set to a logic HIGH state, while the other is set to a logic LOW state. When state control input 180 is set to a logic LOW, state control logic block 155 sets both upper and lower path state control signals 170 and 175 to the LOW state, thus inactivating both the upper and lower paths of the entire multistage multiplexer arrangement.

Although FIGS. 1, 2, and 3 distinguish multiplexer input cells, such as 100, 105, and 200, from multiplexer output cells, such as 150, 250,251, and 252, each of these multiplexer cells can be identical in both design and performance characteristics. Thus, throughout these FIGs, multiplexer output cells can be substituted for multiplexer input cells. In these instances, the upper and lower path state control signals, such as 170 and 175, would be unused. However, nothing precludes one of ordinary skill in the art from using different equipment for multiplexer input and output cells if required by a particular application.

Figure 4:
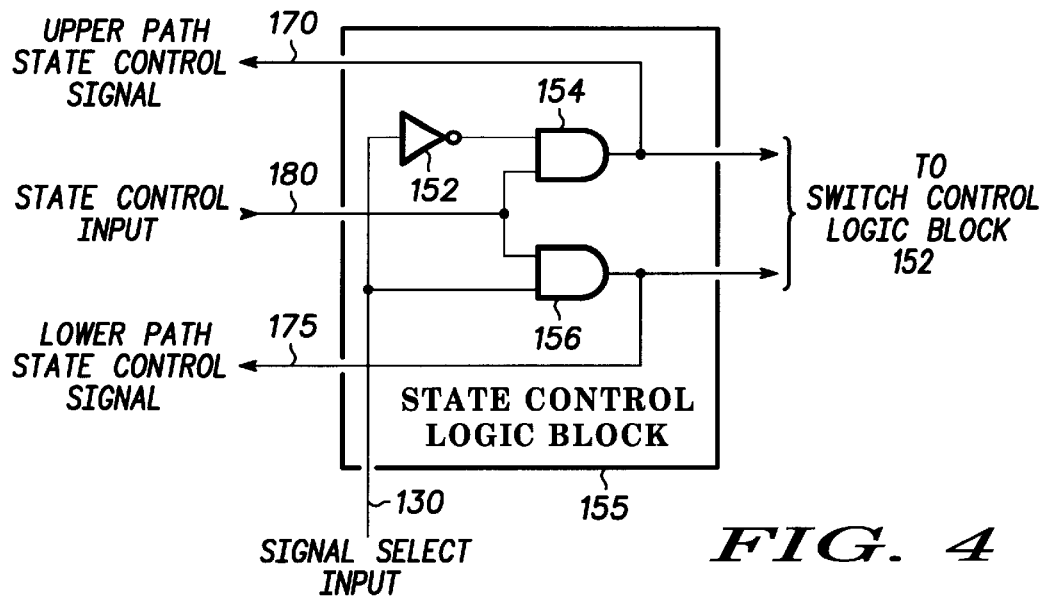
FIG. 4 is a block diagram for the state control logic block used in the multiplexer output cell of FIG. 3 in accordance with a preferred embodiment of the invention.

FIG. 4 is a block diagram for the state control logic block (155) used in multiplexer output cell 150 of FIG. 3 in accordance with a preferred embodiment of the invention. In FIG. 4, signal select input 130 is coupled to an input of AND gate 156 and AND gate 154 through inverter 152. Additionally, state control input 180 is coupled to AND gates 154 and 156. The output of AND gate 154 is coupled to upper path state control signal 170. Similarly, the logic state of AND gate 156 is output to lower path state control signal 175. Further, the outputs of AND gates 154 and 156 are also output to switch control logic block 157, thereby enabling switch control logic block 157 to select between intermediate signal outputs 110 and 115.

Table 1 (herein) provides a listing of values of upper path state control signal 170 and lower path state control signal 175 which result from signal select input 130 and state control input 180.

TABLE 1

| Signal Select Input 130 | State Control Input 180 | Upper Path State Control Signal 170 | Lower Path State Control Signal 175 |
|---|---|---|---|
| Low | Low | Low | Low |
| Low | High | High | Low |
| High | Low | Low | Low |
| High | High | Low | High |

As an example which uses Table 1, if signal select input 130 is set to a logic LOW, while state control input 180 is set to logic LOW, then upper and lower path state control signals 170 and 175 are set to LOW. This represents the power OFF condition for the multiplexer cells which interface with state control logic block 155. However, if signal select input 130 is set to logic LOW, while state control input 180 is set to logic HIGH, then upper path state control signal 170 is set to HIGH and lower path state control signal 175 is set to LOW. Therefore, the upper path which interfaces with state control logic block 155 will operate in a power ON condition, while the lower path is set to a power OFF state. Thus, through control of a signal select input and a state control input, the upper and lower paths of the multiplexer cells can be controlled.

Figure 5:
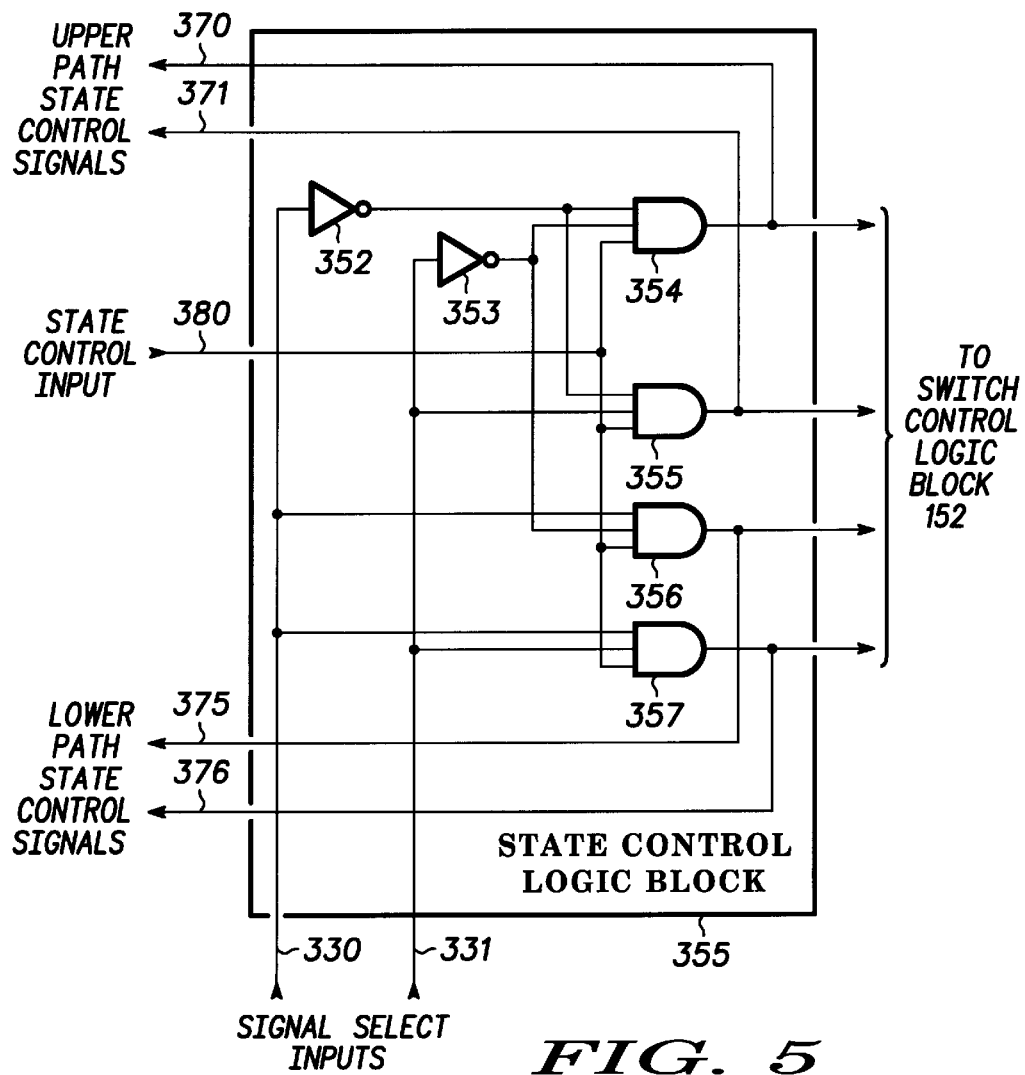
FIG. 5 is a block diagram for a state control logic block which can be used in multiplexer output cell which includes four inputs and a single output in accordance with a preferred embodiment of the invention

FIG. 5 is a block diagram for a state control logic block which can be used in multiplexer output cell which includes four inputs and a single output in accordance with a preferred embodiment of the invention. In FIG. 5, signal select input 330 is coupled to an input of AND gates 356, and 357. Additionally, signal select input 330 is coupled to an input of AND gates 354 and 355 through inverter 352. Similarly, signal select input 331 is coupled to AND gates 355 and 357, and to AND gates 354 and 356 through inverter 353.

State control input 380 of FIG. 5 connects to each of AND gates 354, 355, 356, and 357. The outputs of each of AND gates 354, 355, 356, and 357 are coupled to a switch control logic block (not shown in FIG. 5) which is similar to switch control logic block 157 of FIG. 3. The salient difference being in that the switch control logic block suggested by FIG. 5 desirably selects an output from one of four inputs whereas switch control logic block 157 of FIG. 3 selects between two inputs.

An output of each of AND gates 354, 355, 356, and 357 is preferably coupled to a similar multiplex input or output cell through upper path state control signals 370 and 371, and lower path state control signals 375 and 376, which are comparable to upper and lower path state control signals 170 and 175 of FIGS. 1 and 3. Upper and lower path state control signals 370, 371, 375, and 376, when used with suitable signal select inputs such as signal select inputs 330 and 331, provide power ON/OFF control of the multiplexer cells in the upper or lower signal path.

Table 2 provides the value of the state control signals from AND gates 354, 355, 356, and 357 resulting from signal select inputs 330 and 331 and state control input 380.

TABLE 2

| Signal Select | | State Control | State control | | | |
|---|---|---|---|---|---|---|
| | | | Output | Output | Output | Output |
| Input 330 | Input 331 | Input 380 | 370 | 371 | 375 | 376 |
| X | X | Low | Low | Low | Low | Low |
| Low | Low | High | High | Low | Low | Low |
| Low | High | High | Low | High | Low | Low |
| High | Low | High | Low | Low | High | Low |
| High | High | High | Low | Low | Low | High |

Those fields of Table 2 which are marked with an "X" denote a logic "don't care" in which the state control outputs from AND gates 354, 355, 356, and 357 are independent of the values of signal select inputs 330 and 331 when state control input 380 is set to Logic LOW.

As an example which uses Table 2, if signal select input 330 and 331 are set to LOW and HIGH, respectively, and state control input 380 is set to HIGH, then state control output 371 is set to HIGH, while state control outputs 370, 375, and 376 are each set to LOW. Thus, through control of signal select inputs 330 and 331, in conjunction with state control input 380, the power ON/OFF state of each of the possible signals paths in a multistage multiplexer which makes use of the 4:1 input and output cells can be controlled. Further, those of skill in the art will recognize that the basic strategy of using a plurality signal select inputs and a state control input can be extended to include multistage multiplexer applications which make use of multiplexer cells having any number of inputs such as 8, 16, 32, and so on.

Figure 6:
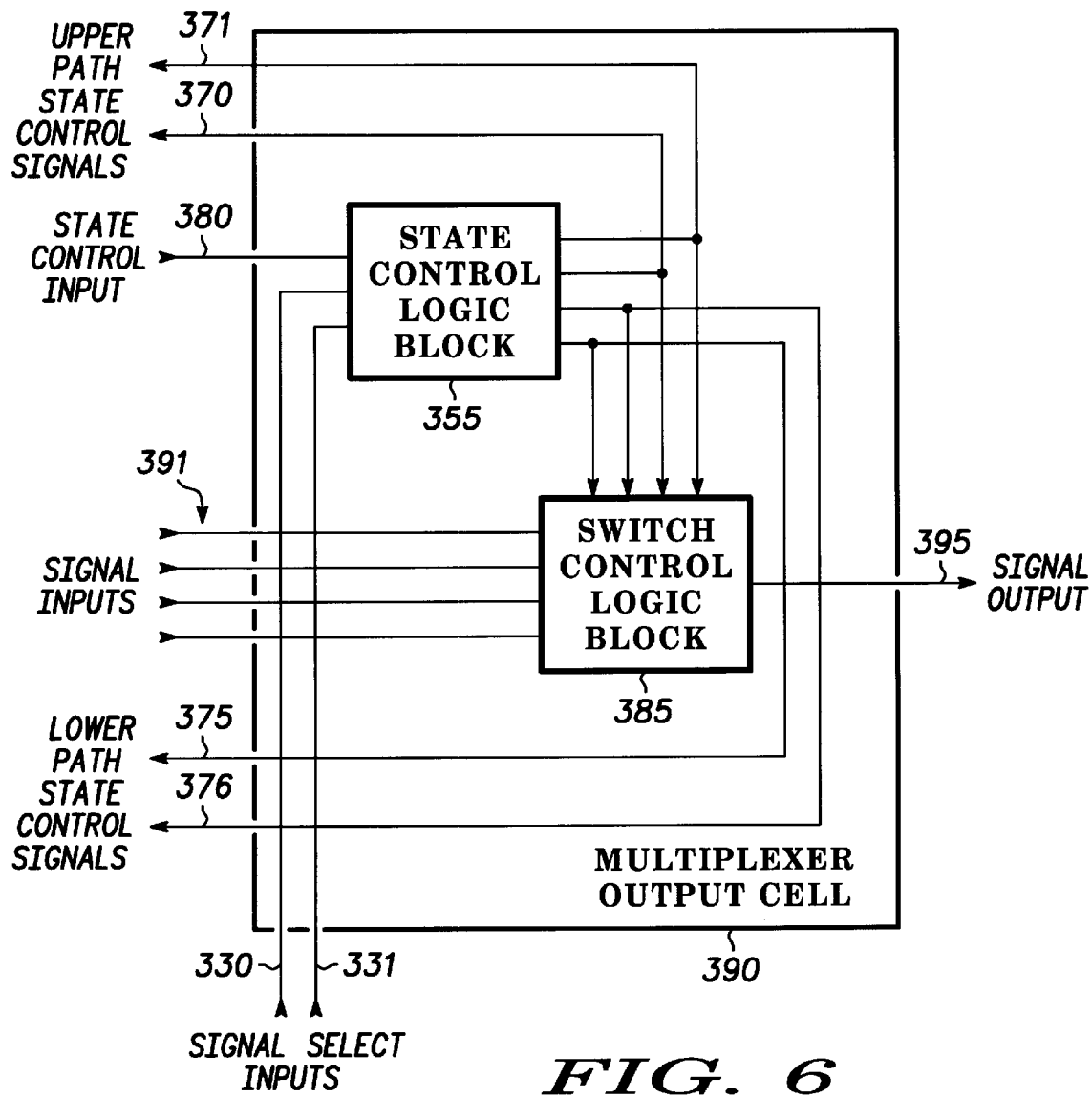
FIG. 6 is a block diagram of the state control logic block (355) of FIG. 5 operating within a multiplexer output cell (390) which includes four inputs and a single output in accordance with a preferred embodiment of the invention.

FIG. 6 is a block diagram of the state control logic block (355) of FIG. 5 operating within a multiplexer output cell (390) which includes four inputs and a single output in accordance with a preferred embodiment of the invention. In FIG. 6, Multiplexer output cell 390 accepts state control input 380 and signal select inputs 330 and 331. These inputs are used by switch control logic block 385 to determine which of signal inputs 391 will be present at signal output 395 of switch control logic block 385. Additionally, upper and lower path state control signals 370, 371, 375, and 376 are output from state control logic block 355 to control the power ON/OFF state of other similar multiplexer cells in the path of signal inputs 391.

Figure 7:
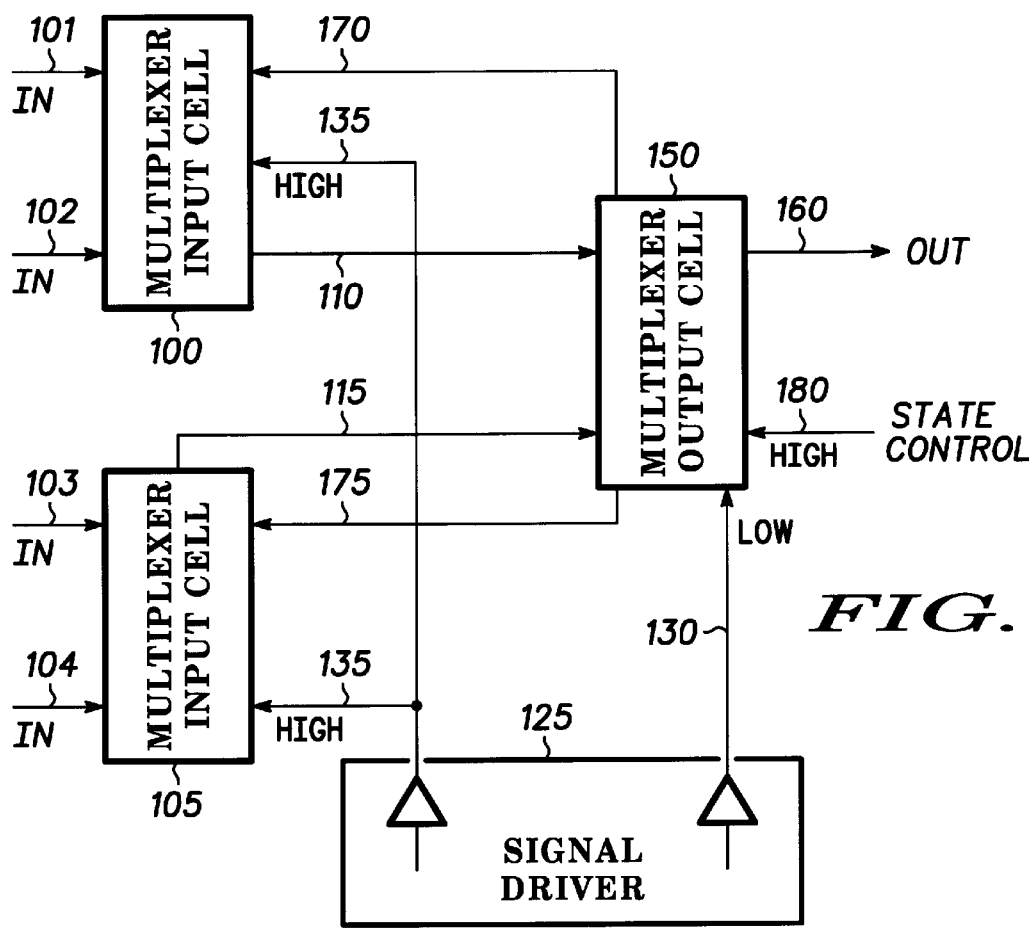
FIG. 7 is a block diagram of the reduced power consumption multistage multiplexer of FIG. 1 where a specific input has been selected to be present at a signal output in accordance with a preferred embodiment of the invention.

FIG. 7 is a block diagram of the reduced power consumption multistage multiplexer of FIG. 1 where a specific input has been selected to be present at a signal output (160) in accordance with a preferred embodiment of the invention. To select input 101, state control input 180 of multiplexer output cell 150 is first set to HIGH. Additionally, signal driver 125 sets signal select input 130 to a logic LOW. From Table 1, multiplexer output cell 150 will consequently set upper path state control signal 170 to logic HIGH, and lower path state control signal 175 will be set to logic LOW. Thus, multiplexer input cell 105 will be set to the power OFF condition. As a consequence of this, signal inputs 103 and 104 will be ignored and intermediate signal output 115 will be inactive.

When signal driver 125 sets signal select input 135 to LOW, multiplexer input cell 100 selects signal input 101 to be present at intermediate signal output 110. This signal is passed through multiplexer output cell 150 and presented on signal output 160.

Figure 8:
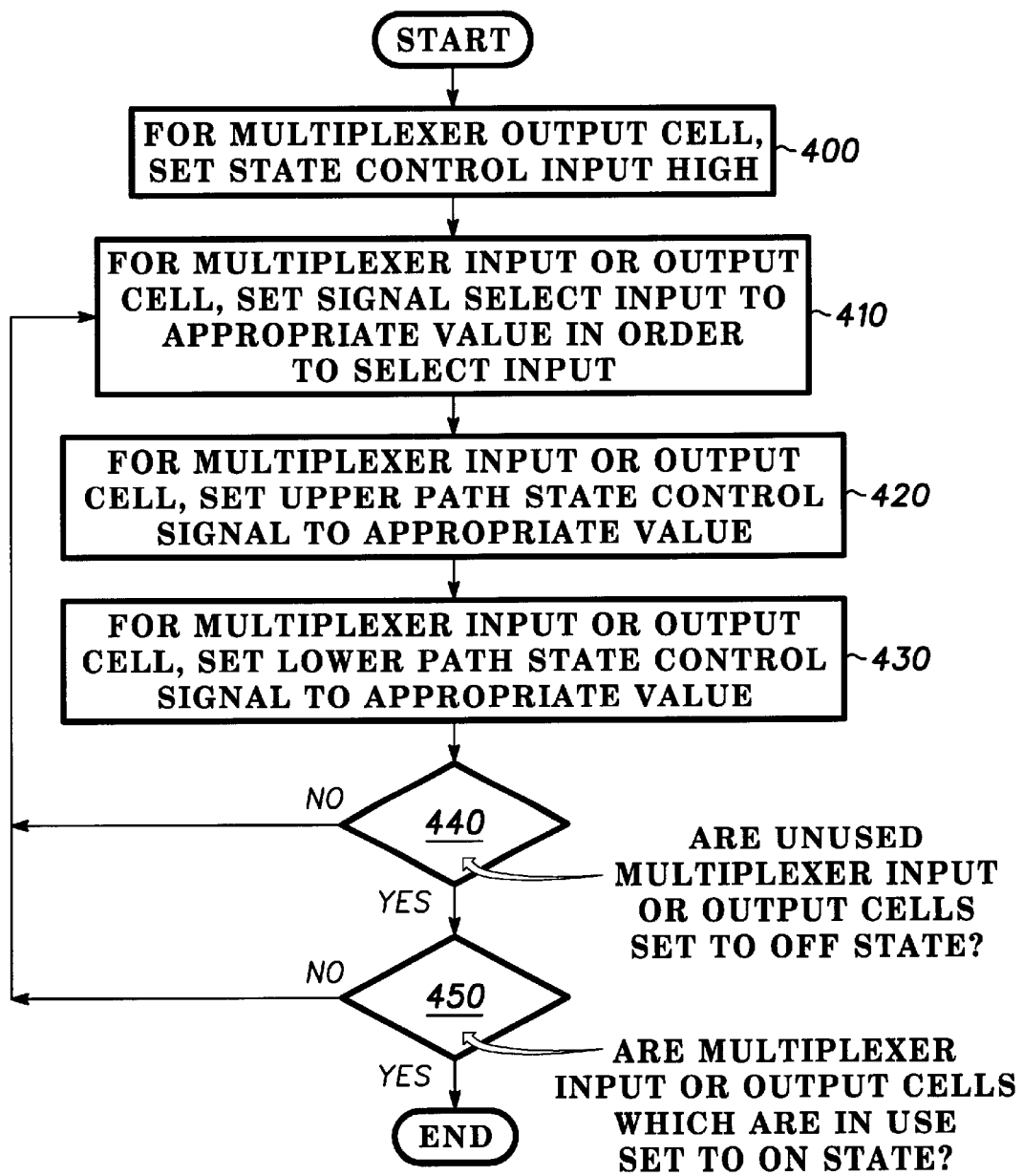
FIG. 8 is a flow chart of a method for selection of a particular input by the reduced power consumption multistage multiplexer of FIG. 1 in accordance with a preferred embodiment of the invention.

FIG. 8 is a flow chart of a method for selection of an input by the reduced power consumption multistage multiplexer of FIG. 1 in accordance with a preferred embodiment of the invention. In step 400, a state control input for a multiplexer output cell is set to an appropriate value in order to select an input to be present at an output of the multiplexer output cell. Desirably, step 400 results in the multiplexer output cell being set to a power ON state using a logic HIGH. The method continues with step 410, where a signal select input for a multiplexer output cell is set to an appropriate value in order to select an input. The method continues with step 420 where the multiplexer output cell sets an upper path state control signal to an appropriate value. In a preferred embodiment, this output is a binary output which either sets a component of the upper path to a power ON or power OFF condition. In step 430, the multiplexer output cell sets a lower path state control signal to an appropriate value. Preferably, executing step 430 results in a component of the lower path being set to either a power ON or power OFF condition.

The method continues with step 440 where a determination is made as to whether unused multiplexer cells should be set to the OFF state. If the decision of step 440 indicates that unused multiplexer output cells are still set to a power ON condition, the method returns to step 410 where a previous multiplexer output cell is acted upon in order to ensure that the previous cell has been set to the appropriate power ON/OFF condition. If the decision of step 440 indicates that all unused multiplexer cells are set to the power OFF position, the method the method executes step 450 where a determination is made as to whether the multiplexer input or output cells which are in use are set to the power ON state. In the event of a negative outcome of step 450, the method returns to step 410. If the decisions of steps 440 and 450 indicate that the proper multiplexer input and output cells are powered ON and OFF, the method terminates.

From the method of FIG. 8, it can be seen the power down task of the multiplexer output and input cells which comprise the multistage multiplexer are conducted by the cells themselves, with little external input. The reduced power consumption multiplexer using self-decoding power down logic provides an efficient means for signal input selection in high speed multiplexers which use technologies such as source coupled field effect transistor logic. The non-blocking digital switch implementation provides built-in channel selection and self-decoding techniques to provide a means for inactivating all logic cells except those in the selected channel path. Additionally, as the multiplexer incorporates a larger and larger number of inputs, the reduction in power consumption increases as well. The implementation is well suited for communications systems which employ orbiting satellites where available power is often both costly and limited.

Accordingly, it is intended by the appended claims to cover all modifications of the invention that fall within the true spirit and scope of the invention.

What is claimed is:

1. A reduced power multiplexer, comprising:
   a plurality of multiplexer input cells configured to accept a plurality of signal inputs and produce an intermediate signal output; and
   a plurality of multiplexer output cells configured to accept said intermediate signal output from said plurality of multiplexer input cells and produce a signal output, said plurality of multiplexer output cells comprising:
      a first signal select input and a second signal select input that are configured to at least partially determine which intermediated signal output from said plurality of multiplexer input cells will be present at said signal output; and
      at least one power down path signal which controls an operating state of one of said plurality of multiplexer input cells.

2. The multiplexer of claim 1, wherein said at least one power down path signal is coupled to at least one of said plurality of multiplexer input cells.

3. The multiplexer of claim 1, wherein at least one of said plurality of multiplexer input cells includes a state control input for accepting said at least one power down path signal.

4. The multiplexer of claim 1, wherein said plurality of multiplexer output cell produces a second power down path signal which controls an operating state of a second one of said plurality of multiplexer input cells.

5. The multiplexer of claim 4, wherein said second power down path signal is coupled to said second one of said plurality of multiplexer input cells.

6. The multiplexer of claim 1, wherein said multiplexer is installed in a satellite-based communications node.

7. The multiplexer of claim 1, wherein said multiplexer is installed in a terrestrial-based communications node.

8. A multiplexer output cell, comprising:
   a plurality of intermediate signal inputs which are output from an electronic device;
   a first signal select input and a second signal select input which determine which of said plurality of intermediate signal inputs will be present at a signal output; and a state control output which controls a power ON/OFF state of said electronic device based on said signal select input.

9. The multiplexer output cell of claim 8, wherein said electronic device is a multiplexer input cell.

10. The multiplexer output cell of claim 8, wherein said signal select input is a binary state input indicating which of two intermediate signal inputs will be present at said signal output.

11. The multiplexer output cell of claim 8, additionally comprising a second state control output which controls a power ON/OFF state of a second electronic device based on said signal select input.

12. A method for reducing power consumption in a multistage multiplexer, comprising:

a multiplexer cell receiving a signal select input, said signal select input being used by said multiplexer cell to select one of a plurality of inputs from a second multiplexer cell, said one of said plurality of inputs being presented at an output;

said multiplexer cell generating a first control signal which causes said second multiplexer cell to remain in a power ON state;

said multiplexer cell generating a second control signal which causes a third multiplexer cell to transition to a power OFF state; and said multiplexer cell accepting a third control signal which causes said multiplexer cell to remain in a power ON state.

13. The method of claim 12, additionally comprising the step of said multiplexer cell receiving a fourth control signal which causes said multiplexer cell to transition from a power OFF state to a power ON state.

14. The method of claim 12, additionally comprising the step of said apparatus determining a value for said signal select input and conveying said value to said multiplexer cell.

* * * * *